United States Patent
Hooper

[11] 3,713,536
[45] Jan. 30, 1973

[54] PRESSURE PULP SCREEN

[75] Inventor: Sydney W. H. Hooper, Sherbrooke, Quebec, Canada

[73] Assignee: S. W. Hopper & Co., Ltd., Sherbrooke, Quebec, Canada

[22] Filed: Nov. 30, 1970

[21] Appl. No.: 93,671

[30] Foreign Application Priority Data

May 11, 1970 Great Britain.....................22,552/70

[52] U.S. Cl. ....................209/273, 209/306, 209/380
[51] Int. Cl. ...............................................B07b 1/20
[58] Field of Search......209/273, 305, 306, 270, 380, 209/268, 300, 250

[56] References Cited

UNITED STATES PATENTS 3,245,535   4/1966   Cowan..............................209/273 X
2,246,669   6/1941   Cowan..............................209/273 X Primary Examiner—Frank W. Lutter
Assistant Examiner—William A. Cuchlinski, Jr.
Attorney—Fetherstonhaugh & Co.

[57] ABSTRACT

A pulp screen of the vertical pressure type having a cylindrical screen and an impeller mounted for rotation within the screen, a conical core on the impeller shaft defines a primary screening compartment below the pulp stock inlet compartment and a secondary screening compartment below the primary compartment, the conical core has a first angled wall defining an upper annular stock screening area of the primary compartment, a series of pairs of blades radiate from the conical core and define a series of radial passages extending the length of the core, and dilution water is fed to the radial passages and to the face of the screen.

15 Claims, 7 Drawing Figures

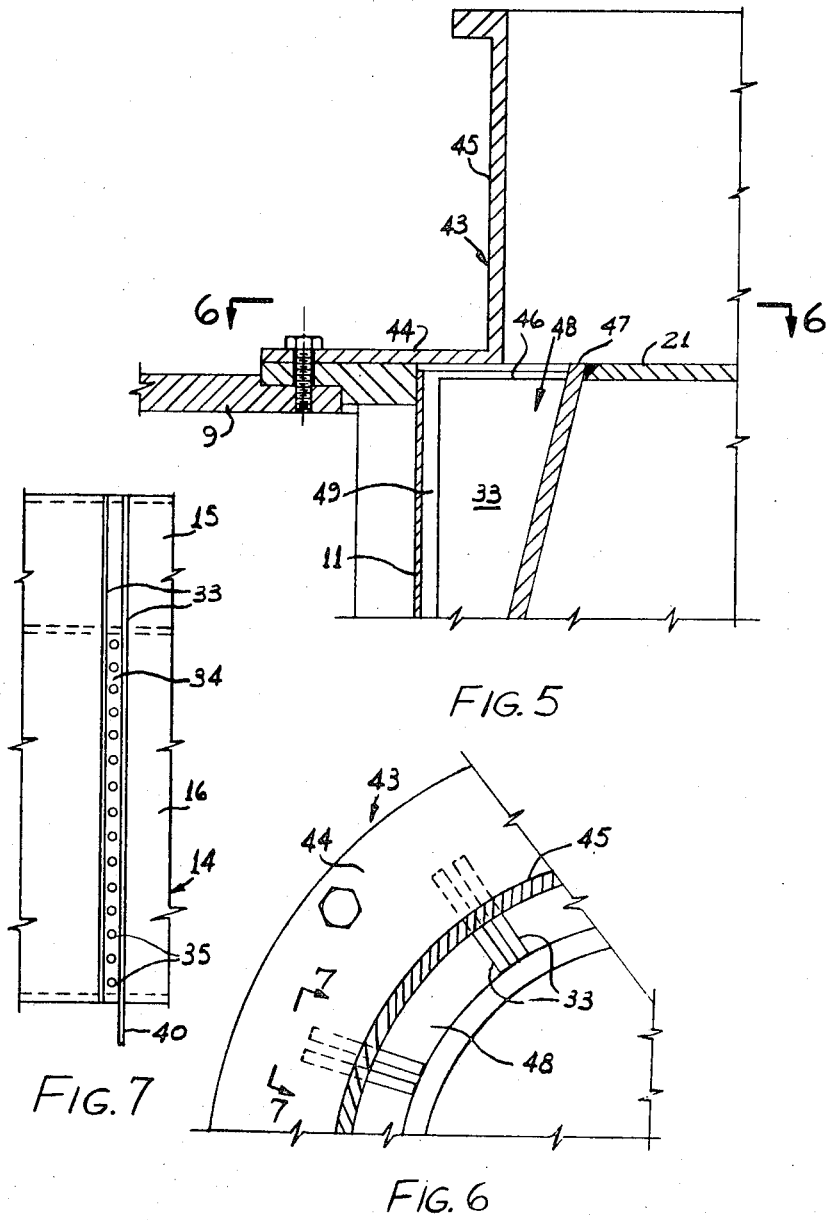

PRESSURE PULP SCREEN

This invention relates to the rotary screening of pulp stock, and more particularly to vertical pressure type pulp screens in which the rotor has a particular configuration in relation to the screen to ensure a maximum separation of the pulp fibers from reject material.

To obtain efficient removal of fiber bundles and slivers suspended in the inlet pulp, and for more efficient screening, it is imperative to introduce not only circular rotation of the pulp slurry but a definite axial velocity of the same slurry has to be also present at the inner side of the screen plate. The axis of the pulp particles have to be oriented parallel with the screen plates and the particles have to move in a circular direction and axial direction along the screen plates at the same time.

It is assumed, and indirectly supported by test results, that in the gravity screen this axial movement is present. In the gravity screen the action of the centrifugal force, the controlled volume of pulp present in the screening area, and the gradual draining of the pulp through the screen plate forces the inner surface of the pulp slurry to take up the shape of a parabolic cone with an air and moisture filled void at the center of the screen. This configuration results in a liquid head differential between the inlet-end and the reject-end of the screen. This head produces the required axial velocity of the pulp slurry along the screen plate towards the reject end of the screen. When the screen is pressurized this dynamic configuration of the pulp within the screening area of the screen ceases to exist.

The design of the screen in the present application takes the aforesaid into consideration and the configuration of the cone is such that it will confine the pulp slurry to the same geometric form as is present in a gravity discharge screen under running conditions, i.e., a geometric form having the shape of a parabolic cone. The impeller consists of a truncated cone whose inlet end is level with the inlet side of the screen. The opposite end of the cone is level with the reject end of the screen. The distance between the impeller face and screen is larger at the inlet than at the reject end, thus the cross-sectional area of the zone through which the pulp moves diminishes. This reduction will compensate for the reduction of pulp slurry volume as the latter is transferring through the screen, thus the axial flow velocity will be a maintained constant.

The inside of the impeller is hollow consisting of an upper sealed off compartment which has only structural purposes and a lower, larger compartment which provides passage for the shower water.

The inside edge of the larger, or reject end of the impeller is equipped with a labyrinthe and forms a narrow gap with the shower water distributing chamber to control the flow of the dilution water to the reject chamber. The configuration of the large, or reject end of the impeller—in combination with the labyrinthe seal—prevents the escape of the shower water from the interior of the impeller, thus the shower water can be maintained at a higher pressure and the combination of the pressure and the centrifugal force acting on the trapped shower water will force the shower water through the shower holes in the side wall of the impeller.

As the pulp slurry proceeds axially along the screen plate, drainage through the screen plate takes place and the consistency of the pulp slurry increases. To prevent this, and to improve separation of the fiber material capable of passing through the screen perforations from the material to be rejected, showering or dilution water is introduced right at the screen plate over approximately three-fourths of the length of the screening area.

The dilution or shower water is introduced through the bottom or outside shell of the pulp screen's main body into a shower water distributing chamber, forming a confined area around the shaft housing. Through large holes in the top of this chamber the shower water in turn passes into the shower water chamber in the impeller.

The lower portion of the outside wall of the shower distributing chamber forms an inner annular wall of the reject chamber.

Attached to the impeller are the rotor blades. Each blade consists of two equal plates attached to the impeller in a radial position and parallel to each other with a narrow opening in between. These blades have the same length as the impeller and their outside edges are parallel with the screen plate. Only a small gap is left between the impeller blades and the screen plate. Positioned between the narrow gap of each twin blade are the shower water holes in the wall of the lower compartment of the impeller.

The purpose of the impeller blades is two-fold. Firstly they provide for the circular rotation of the pulp slurry, secondly the twin blade construction with both blades being of equal length delivers the shower water directly into the fiber mat building up on the adjacent surface of the screen plate. The shower water is forced through the holes of the impeller and through the slots of the pairs of blades partly by the pressure in the shower water chamber of the impeller and the centrifugal force generated by rotation of the impeller.

The pulp slurry enters the screen tangentially to the first, or inlet part of the screen. An inlet ring attached to the top of the screening chamber covers half of the impeller blades in order to reduce eddying around the upper tip of the blades. The vertical part of this ring and the outside of the inlet chamber forms an annular area within which the tangentially entering pulp slurry is forced to rotate. This initial circular motion reduces the forces required to drive the screen rotor. Also the centrifugal action of the rotating stock will force heavy particles to deposit in this inlet annular chamber and prevent them from entering the screening zone where they can cause damage.

The lighter particles of the pulp slurry flows over the vertical part of the inlet ring and into the screening portion proper of the machine where the good fibers are passed through the screen and any reject particles left in the slurry are carried off through a reject discharge outlet.

The large or reject end of the rotor, the outer shell of the shower water distributing chamber and the lower support ring of the screen plates form the reject chamber. The pulp slurry that did not pass through the screen plate will enter this reject chamber passing the narrow gap between the reject end of the screen plate and the larger diameter periphery of the impeller. Dilution water to this chamber is supplied through the narrow gap formed by the outer shell of the dilution chamber and the labyrinthe at the inner edge of the impeller's large or reject end plate. The rejects are discharged through the reject line which passes through the outer shell of the screen body. To provide positive discharge of the rejects, rotor blades are attached to the large or reject end plate of the impeller preferably in axial alignment with at least one of the pair of rotor blades.

An example embodiment of the invention is shown in the accompanying drawings in which:

FIG. 5 is an enlarged partial vertical sectional detail showing the annular stock inlet to the screening chamber.

FIG. 6 is a partial plan view taken on the line 6—6 of FIG. 5.

FIG. 7 is a partial vertical elevation of the surface of the impeller in way of one of the blades.

Figure 1:
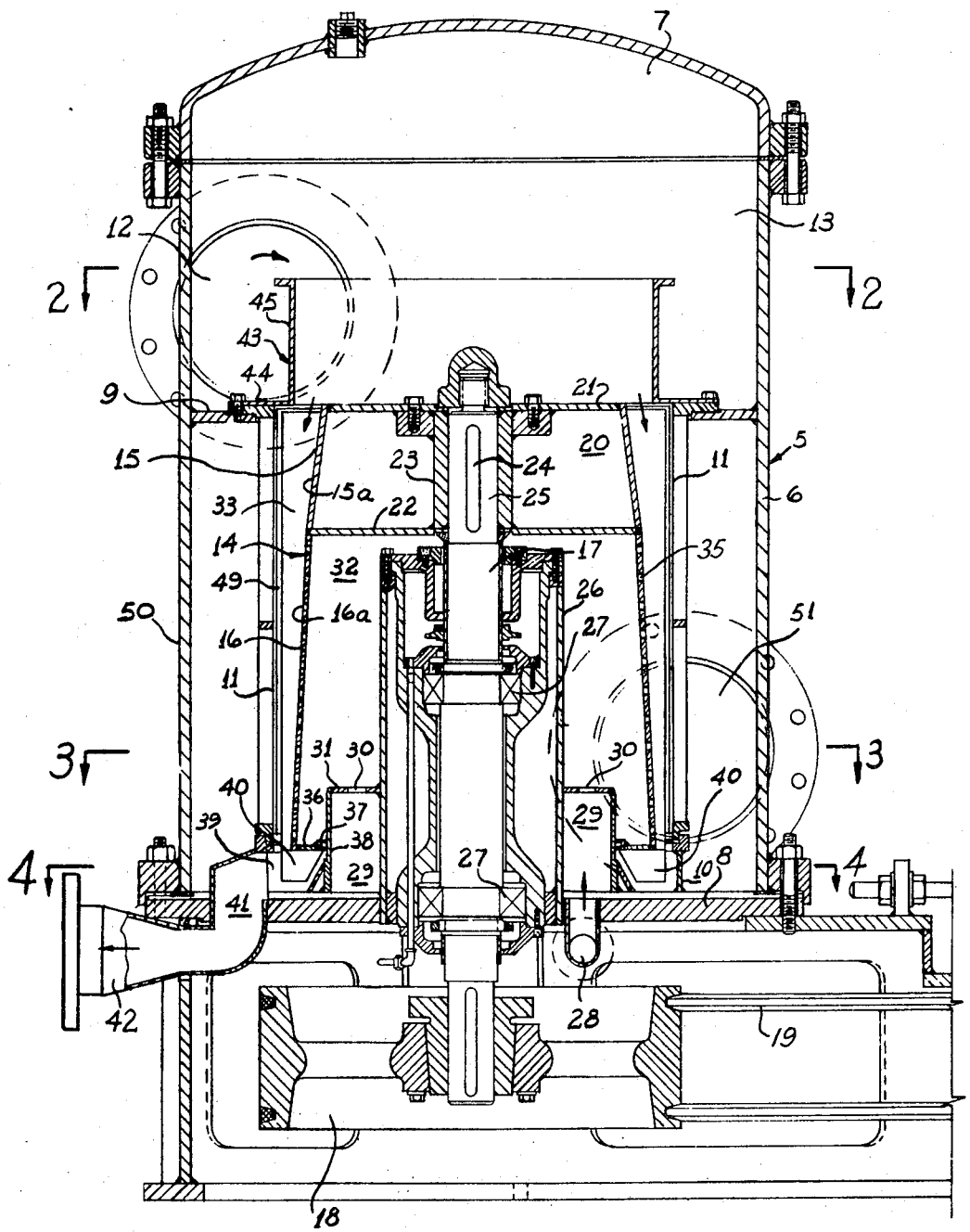
FIG. 1 is a vertical sectional elevation of the pulp screen of the present invention.
Figure 2:
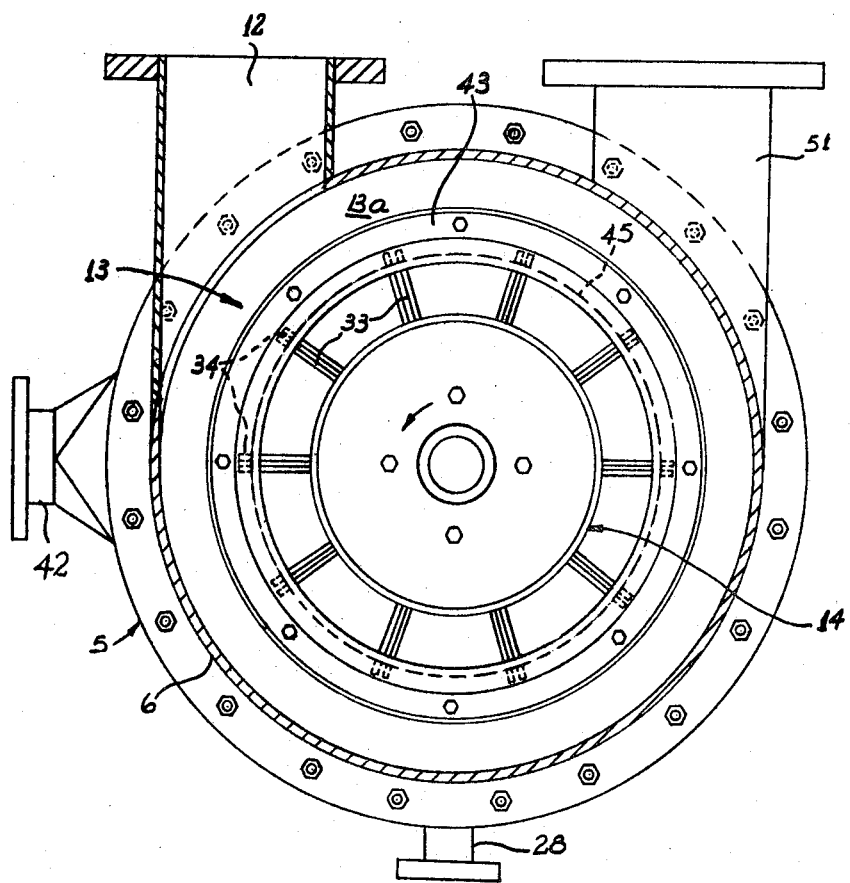
FIG. 2 is a horizontal section taken on the line 2—2 of FIG. 1.
Figure 3:
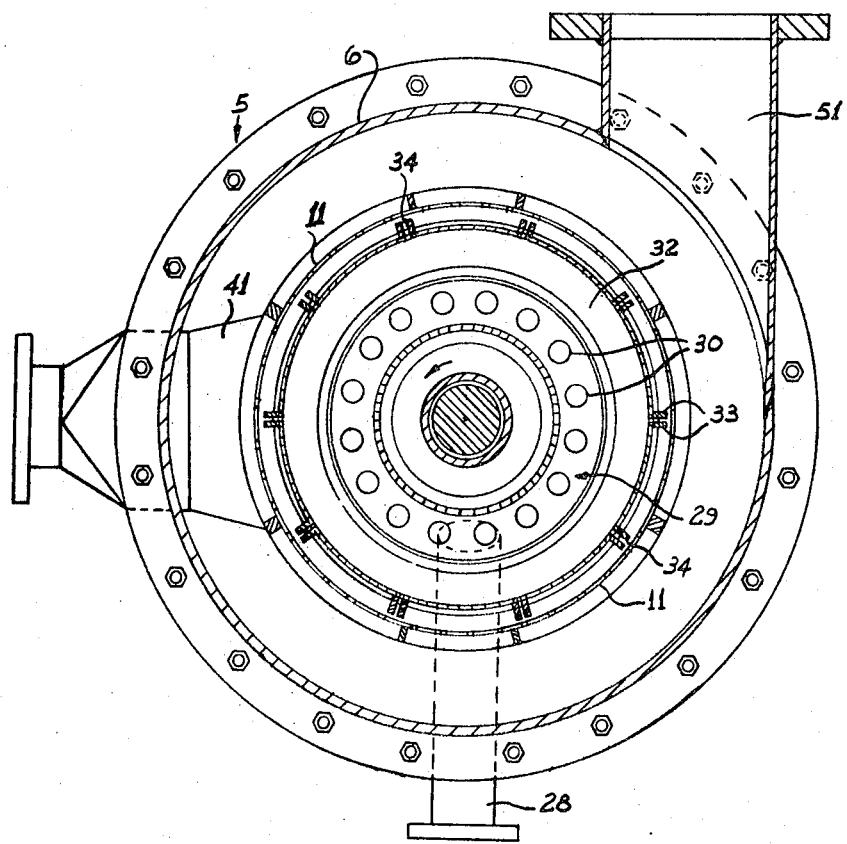
FIG. 3 is a horizontal section taken on the line 3—3 of FIG. 1.
Figure 4:
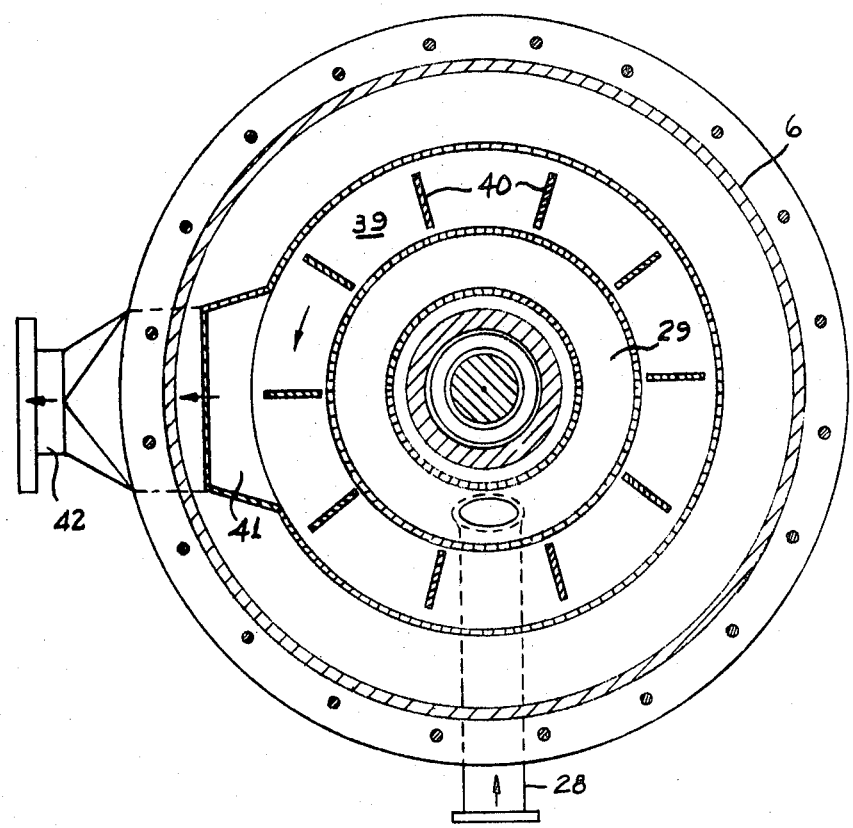
FIG. 4 is a horizontal section taken on the line 4—4 of FIG. 1.

Referring to the drawings, the pulp screening machine 5 consists of a vertically disposed circular housing 6, a top sealing cover 7 and a bottom sealing plate 8.

The circular housing 6 is provided with an annular support ring 9 towards its upper end and a lower support ring 10 between which the annular perforated screen plate 11 is supported.

A pulp stock inlet 12 directs the pulp to be screened into the inlet chamber 13, located above the support ring 9.

An impeller rotor 14 is formed of a truncated cone having an upper portion 5 and a lower portion 16, with the peripheral wall 15a of the upper portion 15 being disposed at a greater angle to the axis of the impeller 14 than the peripheral wall 16a of the lower portion 16.

The impeller 14 is supported on and is rotated by the drive shaft 17 which, in turn, is driven by the pulley 18 and belt drive 19.

The interior of the upper portion 15 of the impeller 14 is a closed chamber 20 formed by the peripheral wall 15a, the upper end wall 21, the interior wall 22, and the internal sleeve 23 is keyed at 24 to the upper end 25 of the shaft 17.

An axial sleeve 26 projects upwards from the bottom sealing plate 8 into the interior of the lower portion 16 of the impeller 14 and houses the bearings 27 supporting the drive shaft 17.

The dilution shower water is fed through the inlet pipe 28 to the annular shower water distributing chamber 29 built around the lower portion of the sleeve 26. A series of apertures 30 in the top wall 31 of the chamber 29 permits the shower water to flow into the chamber 32 within the lower portion 16 of the impeller 14.

A series of pairs of blades 33 radiate outwards from the outer surface of the impeller 14 at spaced intervals around the circumference thereof, and extend radially outwards to within a short distance of the inner adjacent surface of the annular screen 11 to form the longitudinal nozzles 34 extending the full length of the impeller 14. The peripheral wall 16a of the lower portion of the impeller 14 is perforated at 35 in the spaces between the pairs of blades 33 to permit the flow of shower water from the chamber 32 into the nozzles 34 and against the interior surface of the annular screen 11.

The lower end wall 36 of the impeller 14 is formed with a labyrinthe 37 facing the vertical wall 38 of the water distributing chamber 29 to permit a controlled volume of the dilution water to flow from the chamber 32 downwards into the reject chamber 39.

One blade of each pair of blades 33 of the impeller 14 projects downwards into the reject chamber 39 and is extended radially inwards to form the paddles 40. These paddles 40 are designed to propel reject material towards the reject discharge housing 41 and discharge pipe 42. At the same time, any good pulp fibers adhering to the reject material is loosened and is later recovered.

An inlet ring 43, of right angle cross-section, is secured by means of its flange member 44, along with the top end of the annular screen 11, to the screen support ring 9. The upstanding flange member 45 of the inlet ring 43 is located radially inwards of the annular screen 11 so that the flange member 44 partially overlaps the exposed top ends 46 of the impeller blades 33 and, with the adjacent peripheral edge 47 of the top end wall 21 of the impeller 14, defines the pulp stock inlet 48 from the inlet chamber 13 to the screening chamber 49.

The screened pulp, after passing through the annular screen 11 into the chamber 50, is discharged from the apparatus through the outlet 51.

In the operation of this invention, the pulp slurry enters the chamber 13 through the inlet 12 and is concentrated with a tangential motion within the annular area 13a formed by the inlet ring 43, and is constrained to enter the upper part of the screening chamber 49 through the annular inlet 48.

As the inlet ring 43 overlaps a portion of the top edge of the rotor blades 33, it has the effect of reducing eddy currents around the upper ends 46 of the impeller blades.

The vertical flange 45 of the ring 43 and the outer wall of the inlet chamber 13 combine to force the tangentially entering pulp stock slurry to take on a rotary motion. This initial rotary motion of the slurry has the effect of reducing the forces required to drive the screen impeller and consequently reduces the cost of operating the machine. In addition, the centrifugal action of the rotating pulp stock will force heavy particles carried by the stock to be deposited within the annular area 13a of the inlet chamber 13 and thus prevent at least a large proportion of reject material from entering the screening chamber 49 and thereby materially reduces the quantity of reject material which would have to be discharged through the outlet 41. Also, by extracting at least a portion of reject material at the annular area 13a of the inlet chamber 13, damage to the screen 11 will be materially reduced.

As will be seen in FIG. 1, the wall of the upper portion 15 of the rotor 14 is angled more steeply than is the wall of the lower portion 16. This has the effect of permitting a large flow of stock to enter the screening chamber 49 from the inlet chamber 13 with a parabolic cone form and, as the cross-sectional area of the screening chamber is reduced, a high velocity of flow of stock through the screening chamber is maintained.

As the pulp stock moves down the screening chamber and tends to thicken on the screen 11, the dilution water from the chamber 29 is forced through the apertures 30 into the chamber 32 and through the apertures 35 into the nozzles 34 to impinge on the screen 11 and force the pulp fibers through to the outer chamber 50 from where the good fibers are carried away through the discharge outlet 51.

As the nozzles 34 extend the full length of the rotor blades 33 and the outlet of the nozzles is close to the surface of the screen 11 over the whole length thereof, the dilution water, in addition to carrying the pulp fibers through the screen sweeps the fibers ahead on the surface of the screen and thereby dilutes the forming mat to permit the flexible fibers to orient themselves and pass through the apertures in the screen plate 11, and with the dilution water between the blade formed nozzles thins the pulp slurry to further hasten the passage of the fibers through the screen.

By the time a reduced volume of pulp stock reaches the bottom of the screening chamber 49, all of the pulp fibers have been forced through the screen 11, except for a very small amount which have not been washed of reject material, and carried down into the reject chamber 39.

At all times during the operation of the screening of the pulp, the optimum pressure balance within the apparatus will be maintained consistant with the parameters of the pulp slurry being fed to the apparatus.

The embodiments of the invention in which an exclusive property or privilege is claimed are defined as follows:

1. A rotary pulp screening apparatus comprising a housing having an upper pulp stock inlet chamber and a lower pulp stock screening chamber, said inlet chamber having a tangentially disposed stock inlet and the screening chamber having a screened pulp discharge outlet, a cylindrical screen mounted within the screening chamber,
    a rotary impeller having an axial length extending for the length of the screen and mounted for rotation axially within the screen, said impeller being in the form of a truncated cone having an upper portion and a lower portion, the peripheral wall of the upper portion having an angle to the axis of the cone greater than the angle of the peripheral wall of the lower portion with the axis of the cone,
    the upper end of the impeller facing the inlet chamber being closed, an annular inlet ring spaced radially from the upper end of the impeller at the upper end of the screen, said space between the upper end of the impeller and the inlet ring forming an annular inlet to the screening chamber at the upper end of said screen,
    impeller blades radiating from said impeller and extending to within a short distance of the radial inward facing surface of said screen, said blades extending for the full axial length of the said impeller,
    and means on said impeller for directing controlled jets of dilution water from inside said impeller over a major portion of the axial length of the radially inward facing surface of said screen.

2. Apparatus as set forth in claim 1 in which the interior of the upper portion of the impeller is divided from the lower portion of the cone by a division wall and shaft means to rotate the impeller is secured to said upper portion.

3. Apparatus as set forth in claim 2 in which the lower portion of the impeller includes a sleeve housing a bearing assembly for said shaft means.

4. Apparatus as set forth in claim 1 in which said housing has a lower end wall closing said screening chamber, and a sleeve projects upwards from said end wall and into the interior of said impeller, the lower end of said impeller having a labyrinth seal about said sleeve.

5. Apparatus as set forth in claim 4 in which said sleeve includes an annular shower water distributing chamber having a water inlet connection, and a series of apertures in said distributing chamber permit the flow of water from the chamber to the interior of the lower portion of the impeller.

6. Apparatus as set forth in claim 1 in which the peripheral wall of the lower portion of the impeller has a series of perforations located between the pairs of blades forming said nozzles, and shower water is fed to the interior of the lower portion of the impeller and through said nozzles.

7. Apparatus as set forth in claim 1 in which the said inlet ring is of right angle section, a first member of which is secured to the upper end of the said annular screen, and a second member of which is projected upwards in said inlet chamber to form an outer annular reject collecting area and an inner annular inlet from the inlet chamber to the screening chamber.

8. Apparatus as set forth in claim 7 in which said second member of the inlet ring forms an annular weir for retention of reject material within the inlet chamber.

9. Apparatus as set forth in claim 1 in which said inlet ring partially overlaps the upper ends of said blades of the impeller.

10. A rotary pulp screen according to claim 1, wherein said impeller blades are arranged in pairs of blades, the blades of each pair being close together and said means for directing controlled jets of dilution water including means for directing the water through the impeller and between the blades of each pair such that each said pair of blades acts as a nozzle for directing the dilution water against the inward facing surface of the screen.

11. A rotary pulp screen according to claim 10, wherein said means for directing the dilution water is directed only through said lower portion of the impeller.

12. A rotary pulp screen according to claim 10, including a reject chamber located below the said screening chamber and wherein at least one blade of each pair extends downward into the reject chamber.

13. A rotary pulp screen according to claim 1, including a reject material chamber located below the screening chamber, and wherein at least some of said blades extend down into the reject chamber.

14. A rotary pulp screen according to claim 13, said blades in the reject chamber extending radially inwardly to form paddles.

15. Apparatus as set forth in claim 13 in which said reject material chamber has a discharge opening directed radially outwards into a discharge housing and a discharge outlet leads from said discharge housing to the exterior of the apparatus.

* * * * *